United States Patent
Hill

(12) United States Patent (10) Patent No.: US 6,497,938 B1
(45) Date of Patent: Dec. 24, 2002

(54) WOOD-PRODUCT BASED DOOR OR WINDOW COMPONENT AND METHOD OF MAKING THE SAME

(76) Inventor: David A. Hill, 2613 NW. Robert Way, Bend, OR (US) 97701

( * ) Notice: Subject to any disclaimer, the term of this patent is extended or adjusted under 35 U.S.C. 154(b) by 7 days.

(21) Appl. No.: 09/668,835

(22) Filed: Sep. 22, 2000

(51) Int. Cl.[7] .................................................. B32B 5/14
(52) U.S. Cl. ........................ 428/131; 428/192; 428/83; 428/139; 428/67; 52/409; 52/410; 52/411; 52/413; 52/455; 52/302
(58) Field of Search ................................ 428/131, 192, 428/83, 139, 67; 52/798.1, 409, 410, 411, 413, 455, 302

(56) References Cited

U.S. PATENT DOCUMENTS

| | | | | |
|---|---|---|---|---|
| 2,821,497 A | * | 1/1958 | Works et al. | |
| 4,146,662 A | * | 3/1979 | Eggers et al. | 428/68 |
| 5,439,749 A | * | 8/1995 | Klasell et al. | 428/537.1 |
| 6,185,894 B1 | * | 2/2001 | Sisco et al. | 52/457 |

* cited by examiner

Primary Examiner—Harold Pyon
Assistant Examiner—Patricia L. Nordmeyer
(74) Attorney, Agent, or Firm—Kolisch Hartwell, P.C.

(57) ABSTRACT

The following disclosure describes a wood-product based door or window component including a wood-product based core having opposing first and second surfaces and at least a first side edge. Overlaying at least part of the first surface is a first overlay structure that includes a resin-impregnated paper, and overlaying at least part of the second surface is a second overlay structure that includes a resin-impregnated paper. The wood product based core has an edge band attached to the first side edge, and the edge band includes a resin-impregnated paper. The edge band is attached so that a portion of the wood-product based core is between the resin-impregnated paper of the edge band and the resin-impregnated paper overlaying the first and second surfaces.

43 Claims, 3 Drawing Sheets

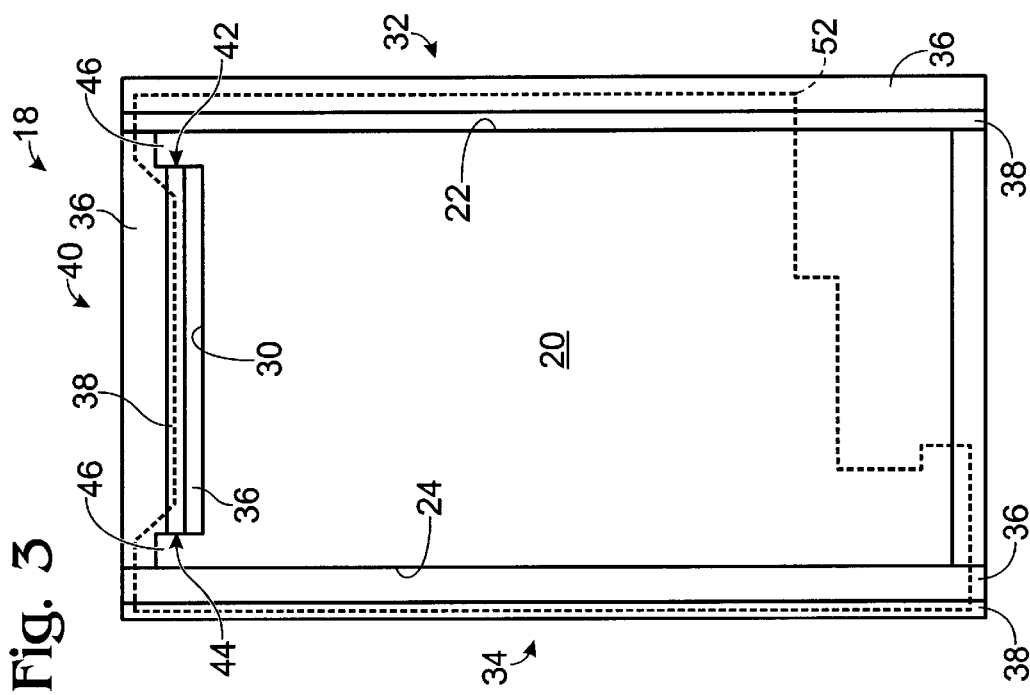
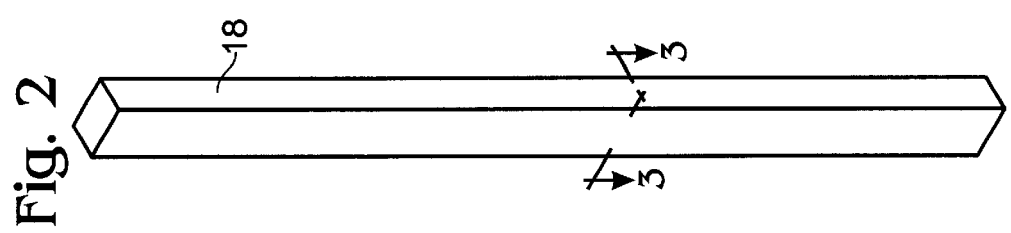
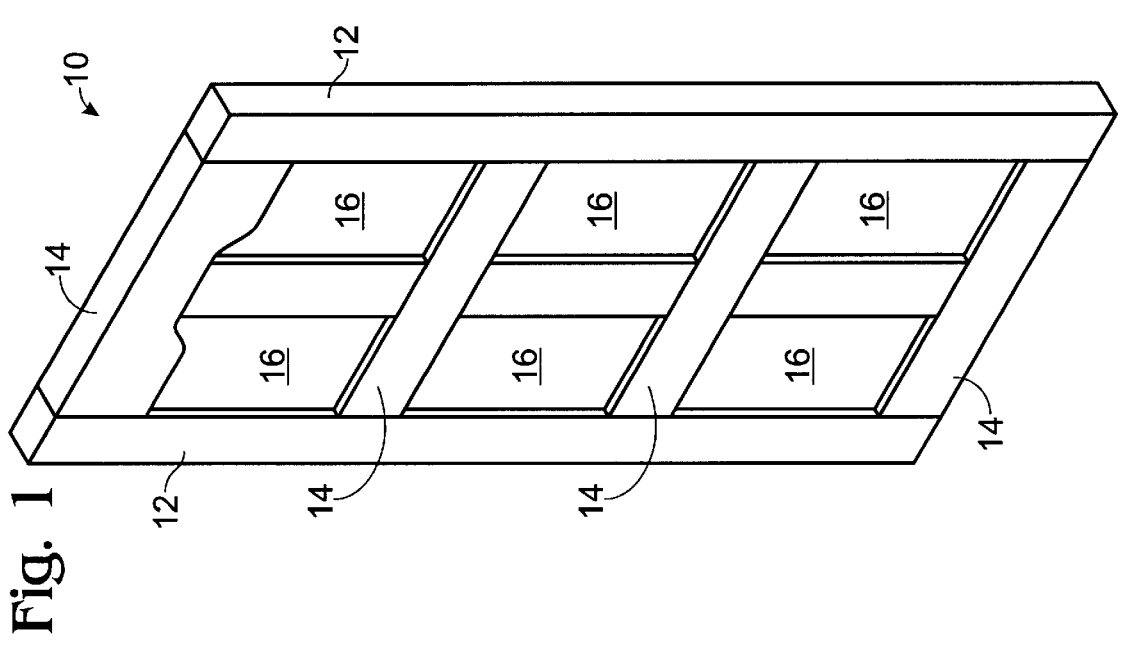

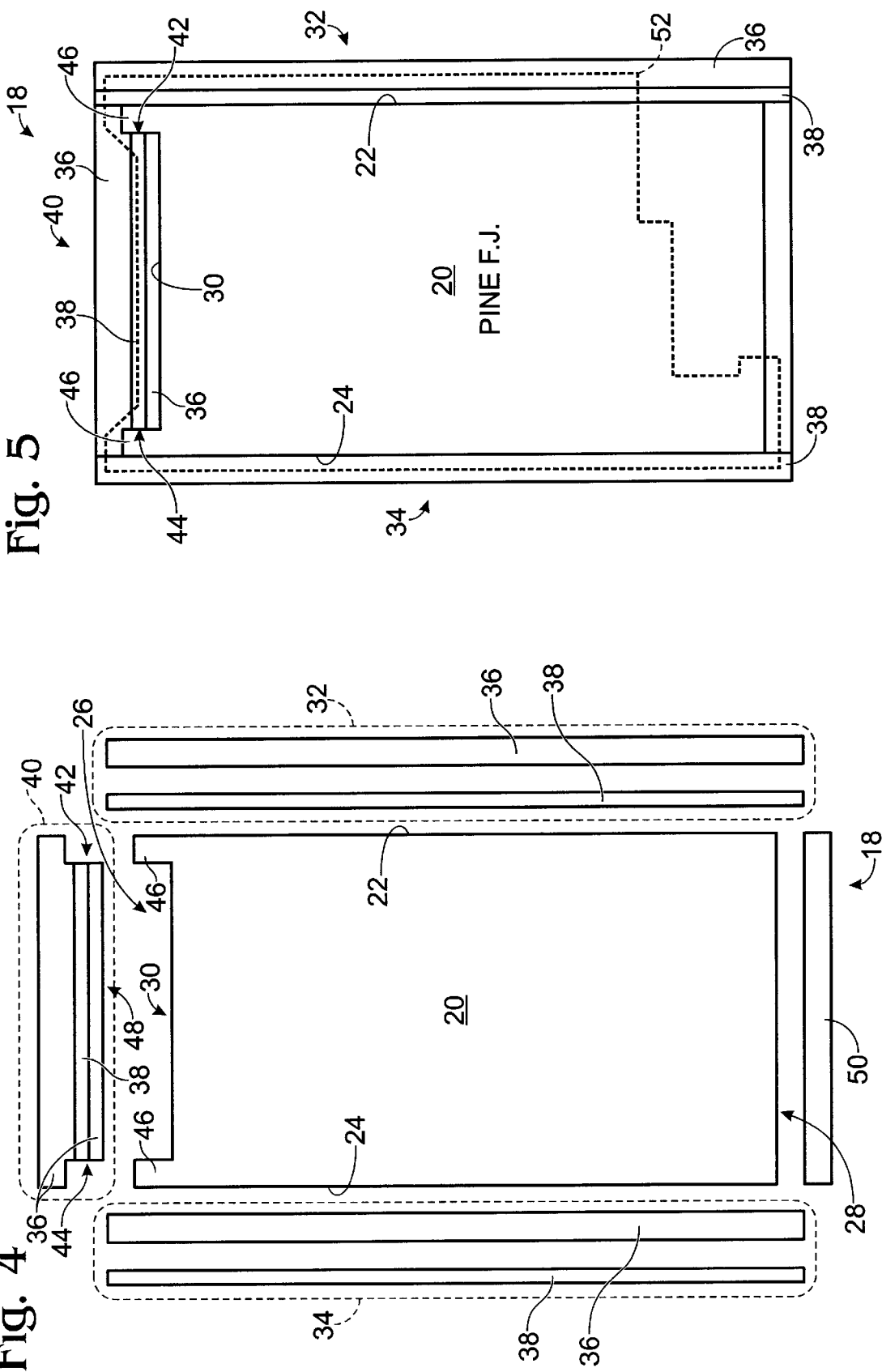

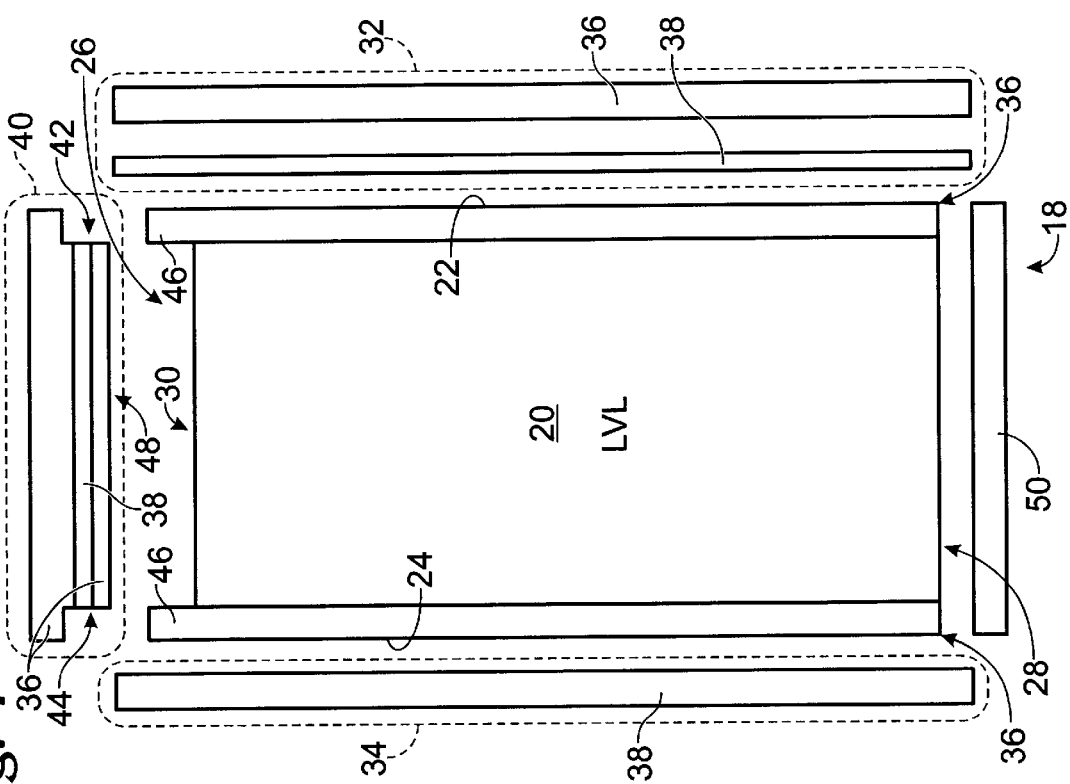
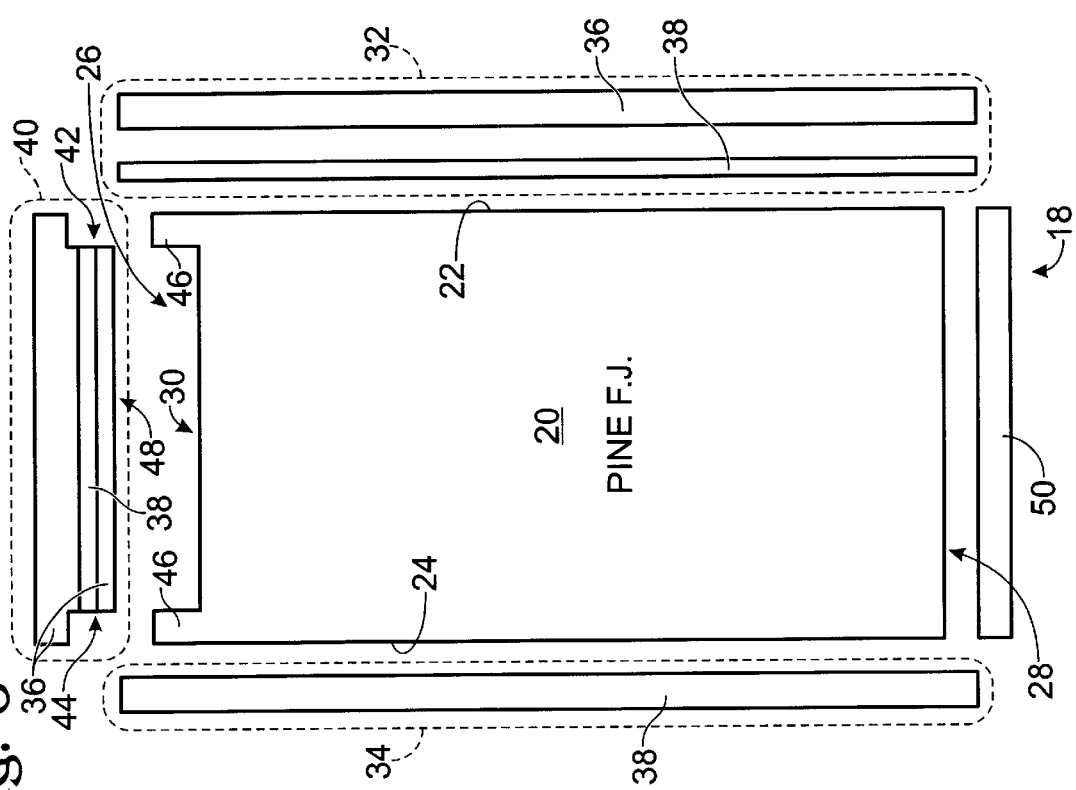

WOOD-PRODUCT BASED DOOR OR WINDOW COMPONENT AND METHOD OF MAKING THE SAME

FIELD OF THE INVENTION

The present invention relates generally to wood-product based structures and more particularly, to wood-product based door and window components.

BACKGROUND

Solid wood door and window components have been widely used for many years. Solid wood is popular because of its attractive appearance. However, solid wood also has many disadvantages. For instance, due to the present scarcity of quality timber, solid wood is expensive. Solid wood tends to crack, split, or warp when exposed to temperature and humidity variations. In addition, solid wood often requires repeated staining and/or painting to maintain the finish and prevent the wood from degrading. In an attempt to alleviate some of these disadvantages and still keep the attractive appearance of solid wood, composite wood door and window components were developed. Composite wood typically includes a natural hardwood veneer attached to a core made of lesser-grade wood, thereby preserving the appearance of solid wood and reducing the overall cost.

Composite wood sometimes includes a resin-impregnated paper overlaying portions of the core and/or veneer. The resin-impregnated paper increases the composite wood's moisture resistance thereby decreasing the amount of cracking, splitting, and warping that occurs. Furthermore, exposed portions of the resin-impregnated paper hold paint and stain longer than the veneer or core.

BRIEF DESCRIPTION OF THE DRAWINGS

FIG. 1 is an isometric view of a wood-product based door having stiles and rails.

FIG. 2 is an isometric view of a wood-product based member constructed according to the present invention that may be used to make a stile for the door in FIG. 1.

FIG. 3 is a cross-sectional view of the wood-product based member in FIG. 2 taken along line 3—3.

FIG. 4 is an exploded cross-sectional view of the wood-product based member in FIG. 2 taken along line 3—3.

FIG. 5 shows another embodiment of the invention.

FIG. 6 shows an exploded view of FIG. 5.

FIG. 7 shows another embodiment of the invention.

DETAILED DESCRIPTION OF THE INVENTION

FIG. 1 shows an exterior door 10 in which a wood-product based door component constructed according to the present invention may be used. The door includes stiles 12, rails 14, and panels 16, as is known in the art. FIG. 2 shows a wood-product based member 18 constructed according to the present invention. A member like member 18 may be used to make a stile 12 for the door 10 in FIG. 1.

FIGS. 3 and 4 show a cross sectional view and an exploded cross sectional view, respectively, along line 3—3 of the wood-product based member 18 shown in FIG. 2. As shown in FIGS. 3 and 4, the wood-product based member 18 includes a core 20 having first and second surfaces 22 and 24 and first and second side edges 26 and 28. The core 20 is a lignocellulose based material such as laminated veneer lumber (LVL), plywood, fiberboard, high-density particle board, etc. The first side edge 26 has a groove 30 extending lengthwise down the composite wood member 18. Preferably, the groove 30 should span most of the distance between the first and second surfaces 22, 24. The groove may be a milled channel cut into the core.

First and second overlay structures 32 and 34, both including a resin-impregnated paper 38, overlay the first and second surfaces of the core 22 and 24, respectively. In the embodiment shown in FIG. 3 and FIG. 4, the first overlay structure 32 includes a veneer 36 and a phenolic paper 38 and attaches to the first surface 22 of the core 20 so that the phenolic paper 38 is positioned between the veneer 36 and the core 20. The second overlay structure 34 includes a veneer 36 and a phenolic paper 38 and attaches to the second surface 24 of the core 20 so that the veneer 36 is positioned between the phenolic paper 38 and the core 20. The first overlay structure 32 with its exposed natural hardwood veneer 36 provides an aesthetically pleasing surface and is intended to face the interior of the structure associated with the door. Second overlay structure 34 with its exposed moisture resistant phenolic paper 38 is configured to be on the exterior of the structure, or is the exterior side of the door. Veneer 50 attaches to second side edge 28 of the core 20.

The phenolic paper 38 used in the depicted first and second overlay structures 32, 34 is made using a natural paper, such as Kraft paper, which is then impregnated with liquid phenolic resin. The liquid phenolic resin is a conventional thermosetting resin, which has low water absorption properties as well as dimensional stability. Examples of phenolic papers include low saturated papers, such as medium density overlay (MDO), decorative laminates, such as formica, or preferably, high pressure phenolic laminates (HPL). High pressure laminates are fully saturated and fully cured laminated sheets, consisting of papers, fabrics, or other core materials that have been laminated at pressures between 1,000 and 4,000 psi using thermosetting condensation resins as binders. High pressure laminates are typically made from a sandwich of melamine-impregnated alpha cellulose overlay and decorative surface papers that are superimposed over phenolic resin-impregnated Kraft papers. The sandwich is pressed at temperatures exceeding 265 degrees Fahrenheit and pressures as high as 1,200 psi. The surface of a high pressure laminate can be finished to either a glossy smooth surface or to a textured or embossed surface.

High pressure laminates are preferable over the other phenolic papers because they have a higher density due to the amount of impregnated resin. The HPL provides an effective moisture barrier as well as a hard dense paintable surface. The first and second overlay structures are attached to the core using an adhesive such as epoxy, solvent born adhesives, water borne adhesives, heat seal adhesives, pressure sensitive adhesives, dry film bonding adhesives or a polyurethane dispersion. Specific adhesives that may be used for phenolic papers include Ashland isoset, PUR (a reactive hot melt), 2-part urethane and epoxy.

In some embodiments, the phenolic papers 38 in the first and second overlay structures 32, 34 may be interchanged with a number of different types of resin-impregnated papers, such as melamine, urea, or other suitable resins. It is contemplated that the invention includes numerous combinations of resin-impregnated paper(s) 38 and/or veneer(s) 36 in both the first or second overlay structures 32 and 34. For instance, either or both the first and second overlay structures 32 and 34 may include only a single resin-impregnated paper 38 without a veneer 36 or multiple veneers 36 and multiple resin-impregnated papers 38 in numerous combinations. In addition, the first and second overlay structures 32 and 34 may include structure other than veneer 36 and resin-impregnated paper 38.

As shown in FIGS. 3 and 4, an edge band 40 attaches to the first side edge 26 of the core 20. Preferably, the edge band 40 includes a resin-impregnated paper 38 sandwiched between two veneers 36. The resin-impregnated paper 38 in the edge band 40 includes first and second sides 42 and 44. The edge band 40 attaches to the first side edge 26 of the core 20 so that a portion of the core 46, also called an "ear," is between the first and second sides 42 and 44 of the resin-impregnated paper 38 in the edge band 40 and the resin-impregnated paper 38 in the first and second overlay structures 32 and 34. In the depicted embodiment, this is accomplished by creating a tongue 48 in the edge band 40 that is received by the groove 30 cut in the first side edge 26 of the core 20. Also, in the depicted embodiment, the resin-impregnated paper 38 is a high-pressure laminate. The edge band 40 is attached to the first side edge 26 using adhesives like those used to attach the first and second overlay structures 32 and 34 to the core 20. Once the edge band 40 is attached, the exposed veneer 36 surface is removed, such as by profiling or machining, to expose the resin-impregnated paper 38. The dashed line 52 in FIG. 3 shows the finished profile of the composite wood member 40.

In some embodiments, the core 20 may comprise finger jointed, edge glued pine. In that embodiment, and in other embodiments with similar cores, phenolic paper 38 in second overlay structure 34 may be applied directly to the core and veneer 36 may be omitted, as shown in FIGS. 5 and 6.

The construction described above and shown in FIGS. 3 and 4 provides a unique stile that presents hard, durable surfaces. The surfaces are easily stained, painted or veneered because of the hard, resin-impregnated surfaces. Additionally, the resin-impregnated layer in edge band 40 protects the core from moisture and wear, while portions 46 of the core that extend adjacent the resin-impregnated paper of the edge band allow the core to shrink and swell due to factors such as resident moisture, heat, moisture trapped when the resin-impregnated surfaces are applied, pressures resulting from the applied resin-impregnated surfaces, etc. The resin-impregnated paper does not completely surround the core because ears or portions 46 separate the resin-impregnated paper on the edge of the core from the resin-impregnated paper on the side surfaces of the core. Providing wood fiber between the resin-impregnated papers provides for a more long-lasting product, and it prevents delamination of the product that otherwise might occur.

When core 20 is LVL, the ears or portions 46 may comprise veneer sheets applied to surfaces of the core, where the veneer forms an ear by extending beyond the edge of the surface to which it is attached, as shown in FIG. 7.

It is contemplated that the invention includes numerous different embodiments of the edge band 40. The edge band 40 can have multiple veneers 36 and multiple resin-impregnated papers 38 in numerous combinations. In addition, the edge band 40 may include structure other than veneer 36 and resin-impregnated paper 38. Furthermore, the edge band 40 may be attached to the core 20 using something other than adhesive.

INDUSTRIAL APPLICABILITY

The present invention is applicable to wood products, and specifically to stiles and rails for doors and windows. Wood products as described above could be assembled by using one pass through a press.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A wood-product based door or window component, comprising:
    a wood-product based core having opposing first and second parallel surfaces configured to form portions of the front and back of a door or window, and at least a first side edge spanning the first and second surfaces in a substantially perpendicular orientation, where the first side edge has a groove formed between elongate ear members;
    a first overlay structure overlaying at least part of the first parallel surface, where the first overlay structure includes a resin-impregnated paper;
    a second overlay structure overlaying at least part of the second parallel surface, where the second overlay structure includes a resin-impregnated paper; and
    an edge band attached to the first side edge of the wood-product based core, where the edge band includes a resin-impregnated paper and where the resin-impregnated paper is disposed substantially within the groove such that the ear members of the wood-product based core extend between the resin-impregnated paper of the edge band and the resin-impregnated paper in the first and second overlay structures so that at least a portion of each ear member is uncovered by a moisture resistant paper.

2. The wood-product based door or window component of claim 1, where the resin-impregnated paper is a high pressure laminate.

3. The wood-product based door or window component of claim 1, where the resin-impregnated paper is a phenolic paper.

4. The wood-product based door or window component of claim 1, where the first overlay structure includes veneer.

5. The wood-product based door or window component of claim 4, where the veneer in the first overlay structure is attached to the first parallel surface.

6. The wood-product based door or window component of claim 1, where the second overlay structure includes veneer.

7. The wood-product based door or window component of claim 6, where the veneer in the second overlay structure is attached to the second parallel surface.

8. The wood-product based door or window component of claim 1, where the edge band includes veneer.

9. The wood-product based door or window component of claim 8, where the veneer is overlaying the resin-impregnated paper.

10. The wood-product based door or window component of claim 1, where the edge band includes a tongue configured to fit into at least a portion of the corresponding groove in the first side edge.

11. The wood-product based door or window component of claim 1, where the resin-impregnated paper in the edge band is exposed prior to painting or staining.

12. The wood-product based door or window component of claim 1, where the edge band has a first and second veneer and where the resin-impregnated paper is positioned between the first and second veneer.

13. The wood-product based door or window component of claim 1, where the resin-impregnated paper in the edge band includes a first side and where the portion of the wood-product based core is between the first side and the resin-impregnated paper overlaying the first parallel surface.

14. A wood-product based door or window component, comprising:
a wood-product based core having opposing first and second parallel surfaces configured to form portions of the front and back of a door or window and at least a first side edge spanning the first and second surfaces in a substantially perpendicular orientation;
a first overlay structure overlaying at least part of the first parallel surface, where the first overlay structure includes a resin-impregnated paper;
a second overlay structure overlaying at least part of the second parallel surface, where the second overlay structure includes a resin-impregnated paper; and
an edge band attached to the first side edge of the wood-product based core, where the edge band includes a resin-impregnated paper and where a portion of the wood-product based core extends between the resin-impregnated paper of the edge band and the resin-impregnated paper overlaying the first and second parallel surfaces so that at least a portion of each ear member is uncovered by a moisture resistant paper.

15. The wood-product based door or window component of claim 14, where the resin-impregnated paper is a high pressure laminate.

16. The wood-product based door or window component of claim 14, where the resin-impregnated paper is a phenolic paper.

17. The wood-product based door or window component of claim 14, where the first overlay structure includes veneer.

18. The wood-product based door or window component of claim 17, where the veneer in the first overlay structure is attached to the first parallel surface.

19. The wood-product based door or window component of claim 14, where the second overlay structure includes veneer.

20. The wood-product based door or window component of claim 14, where the veneer in the second overlay structure is attached to the second parallel surface.

21. The wood-product based door or window component of claim 14, where the edge band includes veneer.

22. The wood-product based door or window component of claim 21, where the veneer is overlaying the resin-impregnated paper.

23. The wood-product based door or window component of claim 14, where the resin-impregnated paper in the edge band is exposed prior to painting or staining.

24. The wood-product based door or window component of claim 14, where the edge band has a first and second veneer and where the resin-impregnated paper is positioned between the first and second veneer.

25. The wood-product based door or window component of claim 14, where the resin-impregnated paper in the edge band includes a first side and where the portion of the wood-product based core is between the first side and the resin-impregnated paper overlaying the first parallel surface.

26. A wood-product based door or window component, comprising:
a wood-product based core having opposing first and second parallel surfaces configured to form portions of the front and back of a door or window, and at least a first side edge spanning the first and second surfaces in a substantially perpendicular orientation, where the first side edge has a groove formed between elongate ear members;
resin-impregnated paper overlaying at least part of each of the first and second surfaces; and
an edge band attached to the first side edge of the wood-product based core, where the edge band includes a resin-impregnated paper and where the resin-impregnated paper is disposed substantially within the groove such that the ear members of the wood-product based core extend between the resin-impregnated paper of the edge band and the resin-impregnated paper overlaying the first and second parallel surfaces so that at least a portion of each ear member is uncovered by a moisture resistant paper.

27. The wood-product based door or window component of claim 26, where the wood-product based core is laminated veneer lumber.

28. The wood-product based door or window component of claim 26, where the wood-product based core is plywood.

29. The wood-product based door or window component of claim 26, where the wood-product based core is fiberboard.

30. The wood-product based door or window component of claim 26, where the resin-impregnated paper is a phenolic paper.

31. The wood-product based door or window component of claim 26, where the wood-product based door or window component is a stile.

32. The wood-product based door or window component of claim 26, where the wood-product based door or window component is a rail.

33. The wood-product based door or window component of claim 26, where the resin-impregnated paper is a high pressure laminate.

34. The wood-product based door or window component of claim 26, further comprising veneer overlaying the first parallel surface and the resin-impregnated paper.

35. The wood-product based door or window component of claim 26, where the edge band includes veneer.

36. The wood-product based door or window component of claim 35, where the veneer is overlaying the resin-impregnated paper.

37. The wood-product based door or window component of claim 26, where the edge band includes a tongue configured to fit into at least a portion of the corresponding groove in the first side edge.

38. The wood-product based door or window component of claim 26, where the resin-impregnated paper in the edge band is exposed prior to painting or staining.

39. The wood-product based door or window component of claim 26, where the edge band has a first and second veneer with the resin-impregnated paper positioned between the first and second veneer.

40. The wood-product based door or window component of claim 26, where the resin-impregnated paper in the edge band includes a first side and where the portion of the wood-product based core is between the first side and the resin-impregnated paper overlaying the first parallel surface.

41. A wood-product based door or window component, comprising:

a wood-product based core having opposing first and second parallel surfaces configured to form portions of the front and back of a door or window, and at least a first side edge spanning the first and second surfaces in a substantially perpendicular orientation, where the first side edge has a groove formed between elongate ear members;

a first overlay structure means overlaying at least part of the first parallel surface for providing a moisture resistant barrier;

a second overlay structure means overlaying at least part of the second parallel surface for providing a moisture resistant barrier; and an edge band means attached to the first side edge of the wood-product based core for providing a moisture resistant barrier;

wherein the wood-product based core extends between the edge band means and the first and second overlay structure means, such that the wood-product based core is at least partially uncovered by the moisture resistant barriers.

42. A method for constructing a wood-product based door or window component, comprising the steps of:

providing a wood-product based core having opposing first and second parallel surfaces configured to form portions of the front and back of a door or window, and at least a first side edge spanning the first and second parallel surfaces in a substantially perpendicular orientation, where the first side edge has a groove formed between elongate ear members, where the first side edge has a groove;

providing an edge band having a resin-impregnated paper;

overlaying the first and second parallel surfaces with resin-impregnated paper; and attaching the edge band to the first side edge so that the resin-impregnated paper is disposed substantially within the groove such that the ear members of the wood-product based core extend between the resin-impregnated paper of the edge band and the resin-impregnated paper overlaying the first and second parallel surfaces so that at least a portion of each ear member is uncovered by a moisture resistant paper.

43. The method of claim 42, further comprising exposing the resin-impregnated paper in the edge band.

* * * * *